Oct. 28, 1924.

C. P. CLARK

CLUTCH

Filed Jan. 24, 1922

Inventor,
Charles P. Clark
By Vernon E. Hodges
his Atty.

Oct. 28, 1924.
C. P. CLARK
1,513,490.
CLUTCH
Filed Jan. 24, 1922    3 Sheets-Sheet 3
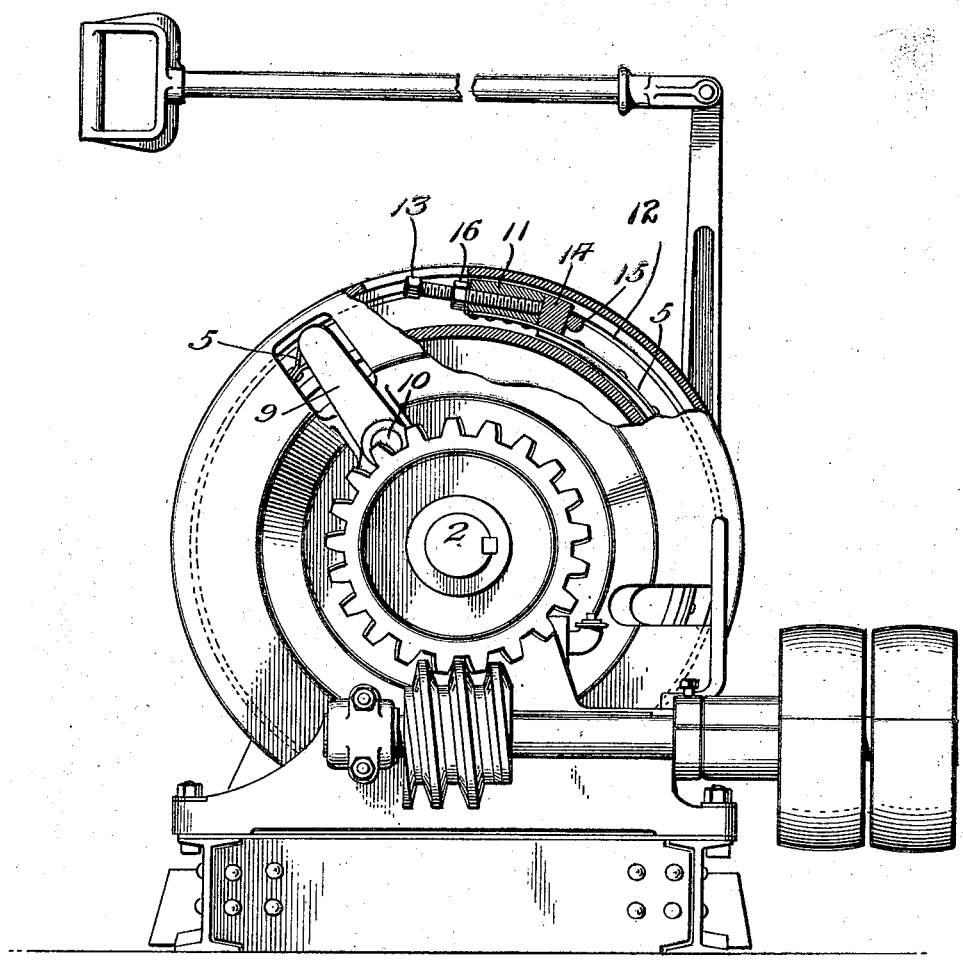
Fig. 3.
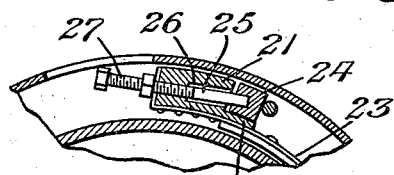
Fig. 4.
Fig. 5.
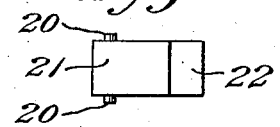
Inventor:
Charles P. Clark
By Vernon E. Hodges
his Atty.

Patented Oct. 28, 1924.

1,513,490

UNITED STATES PATENT OFFICE.

CHARLES P. CLARK, OF OLEAN, NEW YORK, ASSIGNOR TO CLARK BROTHERS COMPANY, OF OLEAN, NEW YORK, A CORPORATION OF NEW YORK.

CLUTCH.

Application filed January 24, 1922. Serial No. 531,375.

*To all whom it may concern:*

Be it known that I, CHARLES P. CLARK, a citizen of the United States, residing at Olean, in the county of Cattaraugus and State of New York, have invented certain new and useful Improvements in Clutches, of which the following is a specification.

My invention relates to an improvement in clutches.

One of the novel features resides in the adjustment of the drive clutch. This includes a clutch-band and a housing which entirely supports the band, there being a block slidably mounted in the clutch housing, and connected with one end of the band, a clutch block, and means for adjusting the band by applying pressure to the latter.

This invention further consists in a shaft, a clutch pulley loosely mounted on the shaft, a drive clutch housing keyed fast to the shaft, a clutch band within the clutch housing and between the latter and the clutch pulley, a band clutch lever pivotally mounted on the housing and connected with one end of the clutch band, a clutch cone slidably mounted on the shaft for actuating the band clutch lever, an adjusting block connected with the other end of the clutch band, a stationary clutch block, and an adjusting screw which extends through the adjusting block and engages the clutch-block for adjusting the band.

In the accompanying drawings:—

Fig. 3 is an end view with parts broken away to show the adjusting screw and block;

Fig. 4 is an illustration of a slight variation in the adjusting block mechanism;

Fig. 5 is a detached plan view of the adjusting block shown in Fig. 4.

Figure 1:
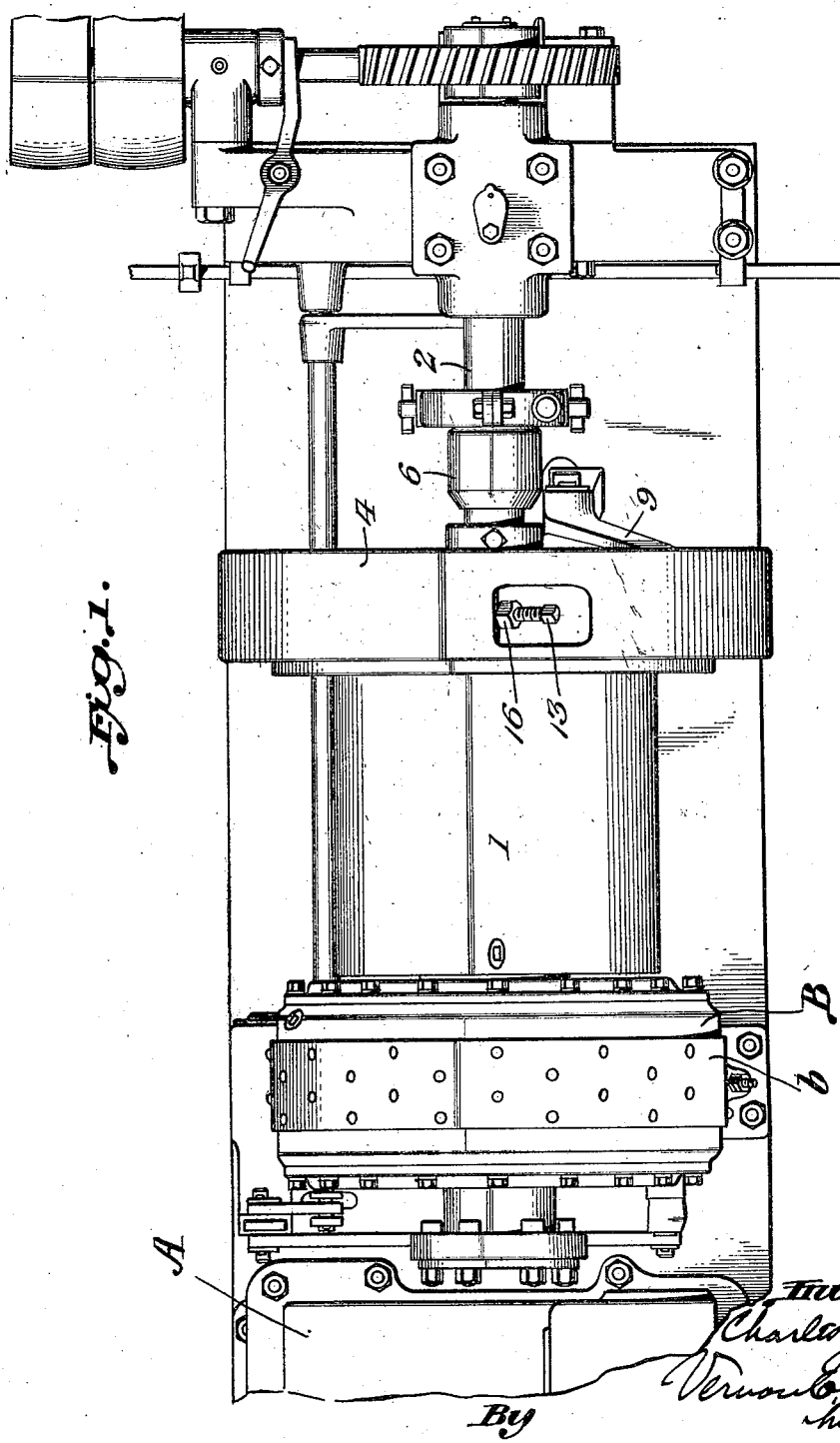
Fig. 1 is a plan view.

A indicates an engine; B, a reverse clutch drum adjacent thereto; and *b*, a reverse clutch band on the reverse drum.

The numeral 1 represents the clutch pulley which is mounted on the clutch shaft 2, and turns freely on roller-bearings 3, when neither the drive clutch band nor the reverse brake band is engaged.

The numeral 4 indicates the drive clutch housing, which is keyed fast to the clutch shaft 2 and contains the clutch band 5 which is interposed between the clutch housing and the rim of the clutch pulley.

Figure 2:
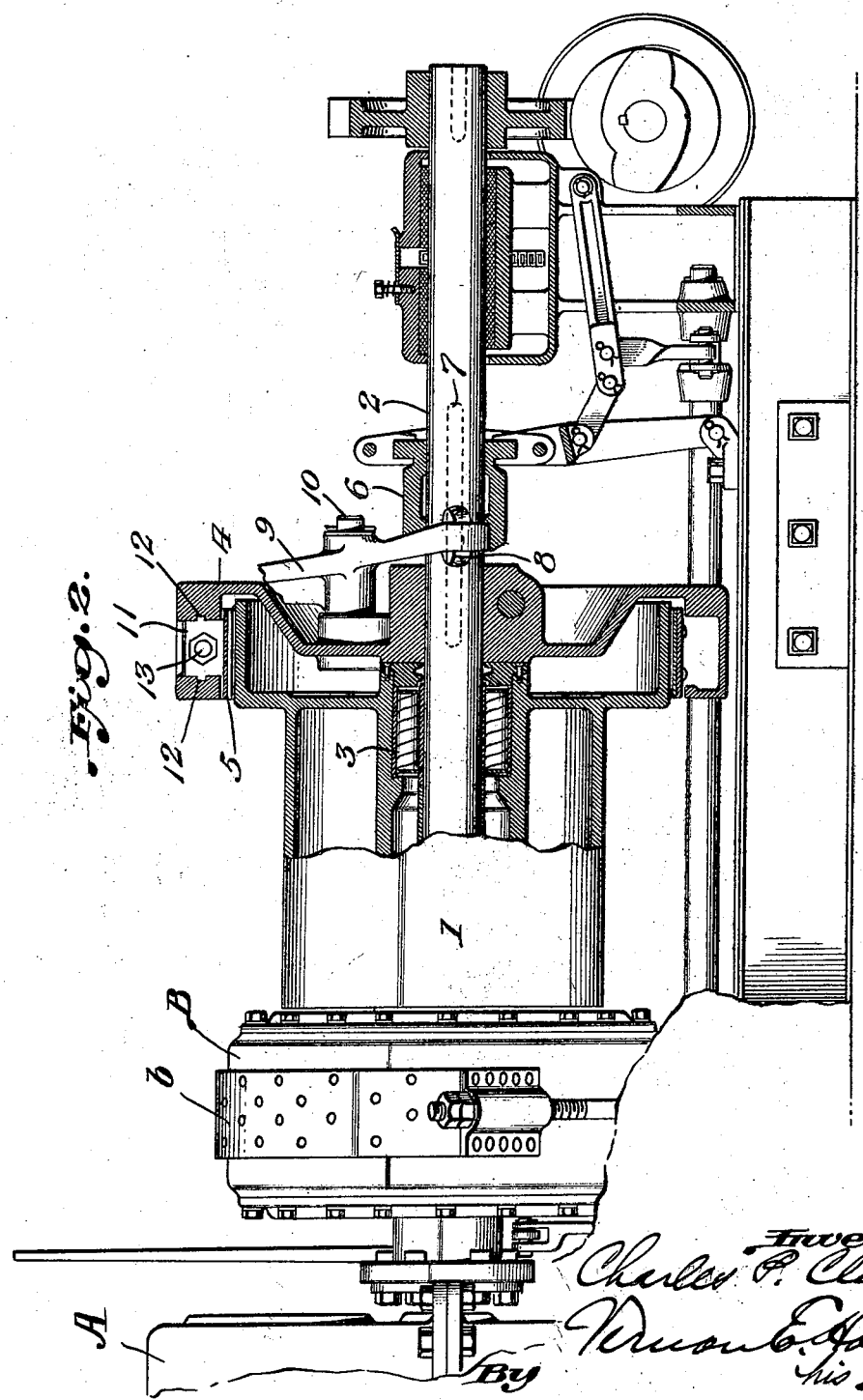
Fig. 2 is a view in vertical, longitudinal section.

When the clutch pulley is free, this clutch-band 5 is thrown out against the housing, and is out of contact with the friction surface of the clutch pulley rim, as shown in Fig. 2.

A clutch cone 6 is held slidably on the shaft 2 by a key 7 indicated in dotted lines in Fig. 2.

To engage the drive clutch, the clutch cone 6 is slid to the left beneath the roller 8 carried by the band clutch lever 9, which is pivotally mounted on a stud 10 projecting from the clutch housing, and the engagement of the cone beneath this roller 8 swings the band clutch lever 9, one end of which is connected with one end of the clutch band 5 (see Fig. 3), and when this lever 9 is actuated by the cone it contracts the clutch band 5 so as to grip the rim of the clutch pulley 1, thus making the clutch pulley turn with the shaft 2.

The opposite end of the clutch-band 5 is riveted to a steel adjusting block 11, which is slidably mounted in the clutch housing by means of the tongue and groove guides 12, on either side, as shown in Fig. 2, which latter are concentric with the rim of the pulley, as indicated by the dotted lines in Fig. 3. Threaded in the steel adjusting block 11 is an adjusting screw 13, which screw abuts against a clutch-block 14, which in turn is held from sliding in the groove by a pin 15. As the clutch-band wears, this wear is taken up by adjusting the screw 13 to the right. When adjusted, the screw is held in place by a lock-nut 16.

It will be observed that the housing 4 entirely supports the clutch-band, by means of the grooves in its walls, and slidably supports the adjusting block for adjusting the clutch-band. By reason of the guide-grooves of this adjusting block being concentric with the rim of the pulley, the clutch band is always kept at the same distance over the pulley, thus insuring against excessive bending of the band.

Lest there should be a possibility of a weakness occurring in the clutch-band at the point where it leaves the edge of the adjusting block 11, due to the movement of the block being limited to a definite endwise movement, any such tendency would be entirely overcome by changing the tongue and groove on the adjusting block into trunnions 20 on the sides of the adjusting block 21, and fitting these to the groove, thus permitting a greater freedom of action of the block 21 than would be possible with a mere tongue and groove connection, as in this way the adjusting block would lend itself to ready adjustment with respect to the band, obviating any tendency to bend the band where it leaves the edge of the adjusting block.

In this form of construction, the end 22 of the adjusting block is preferably elongated, extending beneath the clutch-block 24, forming a more extended bearing on the band 23. In this form of construction, a pin or stud 25 extends from the clutch-block 24 into a clearance space 26, in the head of the adjusting-block 21 (as shown in Fig. 4), and the adjusting screw 27 bears upon the end of the pin or stud instead of directly upon the clutch-block, at a point more or less in line with the trunnions 20, in order to admit of the flexibility of movement that may be required by the position or direction taken by the band 23.

I claim:

1. In a device of the character described, the combination of a shaft, a clutch pulley mounted thereon, a drive clutch housing secured to the shaft, a clutch band, an adjusting block slidably connected with the housing to move in the arc of a circle and means for adjusting the block whereby to adjust the clutch band.

2. In a device of the character described, the combination of a shaft, a clutch pulley mounted thereon, a drive clutch housing secured to the shaft, a clutch band, an adjusting block connected with the clutch band and slidably connected with the housing to move in the arc of a circle, a screw screw-threaded through the adjusting block, a clutch block secured against the housing, and against which one end of the screw engages, whereby to adjust the clutch-band.

3. In a device of the character described, the combination of a shaft, a clutch pulley loosely mounted thereon, a drive clutch housing keyed fast to the shaft, a clutch band within the housing and between the latter and the rim of the clutch pulley, a lever pivoted to the housing and having one end connected to the clutch-band, adjustable means carried by the shaft in position to actuate the clutch lever to apply the friction of the band to the rim of the clutch pulley, an adjusting-block having tongue and groove connection within the housing and connected to the clutch-band, said connection being slidable in an arc of a circle connected with the clutch band, and means for adjusting said block to adjust the band.

4. In a device of the character described, the combination of a shaft, a clutch pulley mounted thereon, a drive clutch housing secured to the shaft, said housing having concentric grooves therein, a clutch band, and an adjusting block slidable in said grooves, for adjusting the clutch band.

5. In a device of the character described, the combination of a shaft, a clutch pulley loosely mounted thereon, a drive clutch housing keyed fast to the shaft, a clutch band interposed between the housing and the clutch pulley, a lever fulcrumed on the housing and connected at one end to one end of the band, and having a roller on the other end, a cone slidably mounted on the shaft in position to engage the roller on the lever to swing the latter and in turn apply endwise pressure to the band, and means for adjustably connecting the opposite end of the band to the housing, which includes an adjustable block slidably connected with the housing to move in the arc of a circle, a screw screw-threaded through the adjusting block, a clutch-block secured against the housing and against which one end of the screw engages, whereby to adjust the clutch-band.

6. In a device of the character described, the combination with a shaft, a clutch pulley mounted thereon, a drive clutch housing keyed to the shaft, and a clutch band, of an adjusting block having tongue and groove connection with the housing and connected to the clutch band, said tongue and groove connections being slidable in an arc of a circle concentric with the clutch band and means adjusting said block for adjusting the band.

7. The combination with two concentric drums, a clutch-band, and means for adjusting the band and located and housed wholly within the annular space between the two drums, said means including a block, and concentric guides for the block to cause it to move when adjusted in a direction concentric with the two drums.

In testimony whereof I affix my signature.

CHARLES P. CLARK.